(12) United States Patent
Matsumura

(10) Patent No.: US 11,036,729 B2
(45) Date of Patent: Jun. 15, 2021

(54) DOCUMENT CREATION SUPPORT SYSTEM

(71) Applicant: GRACE TECHNOLOGY, INC., Tokyo (JP)

(72) Inventor: Yukiharu Matsumura, Tokyo (JP)

(73) Assignee: GRACE TECHNOLOGY, INC., Tokyo (JP)

( * ) Notice: Subject to any disclaimer, the term of this patent is extended or adjusted under 35 U.S.C. 154(b) by 0 days.

(21) Appl. No.: 16/964,469

(22) PCT Filed: Oct. 3, 2019

(86) PCT No.: PCT/JP2019/039203
§ 371 (c)(1),
(2) Date: Jul. 23, 2020

(87) PCT Pub. No.: WO2020/116014
PCT Pub. Date: Jun. 11, 2020

(65) Prior Publication Data
US 2021/0011906 A1 Jan. 14, 2021

(30) Foreign Application Priority Data
Dec. 5, 2018 (JP) .............................. JP2018-227935

(51) Int. Cl.
*G06F 16/24* (2019.01)
*G06F 16/242* (2019.01)
(Continued)

(52) U.S. Cl.
CPC ...... *G06F 16/244* (2019.01); *G06F 16/24573* (2019.01); *G06F 16/93* (2019.01); *G06F 40/186* (2020.01)

(58) Field of Classification Search
CPC ........ G06F 16/244; G06F 16/93; G06F 40/14; G06F 40/186; G06F 40/154;
(Continued)

(56) References Cited

U.S. PATENT DOCUMENTS 5,930,811 A 7/1999 Nojima et al.
7,120,869 B2* 10/2006 Birder .................. G06F 40/157
715/234

(Continued)

FOREIGN PATENT DOCUMENTS

| JP | 9-128391 A | 5/1997 |
| JP | 2001-331481 A | 11/2001 |
| JP | 2004-62745 A | 2/2004 |

OTHER PUBLICATIONS

Japanese Office Action (JPOA) dated Mar. 12, 2019 for the corresponding Japanese Patent Application No. 2018-227935.

(Continued)

*Primary Examiner* — Merilyn P Nguyen
(74) *Attorney, Agent, or Firm* — Rankin, Hill & Clark LLP

(57) ABSTRACT

A document creation support system that can effectively find a necessary part is provided. A manual creation support server acquires a part attribute corresponding to a manual during creation as a search key, searches, via a part attribute of a manual management table 420 corresponding to the acquired search key, a part management table 440 for a part used in a manual corresponding to the part attribute, and aggregates a part used in the manual during creation and the searched part as one part. In the part aggregation, as to aggregation object parts A and B, each difference portion from the other is determined, and the aggregation object parts A and B are aggregated as one part in which texts included in the difference portions of the aggregation object parts A and B are replaced with a variable name.

6 Claims, 12 Drawing Sheets

(51) Int. Cl.
*G06F 16/2457* (2019.01)
*G06F 16/93* (2019.01)
*G06F 40/186* (2020.01)

(58) Field of Classification Search
CPC .... G06F 40/106; G06F 40/131; G06F 40/137; G06F 16/80; G06F 16/9558; G06F 16/81; G06F 16/835; G06F 16/334; G06F 40/103; G06F 40/174; Y10S 707/99933
See application file for complete search history.

(56) References Cited

U.S. PATENT DOCUMENTS

| | | | | |
|---|---|---|---|---|
| 7,561,734 | B1* | 7/2009 | Wnek | G06K 9/2054 |
| | | | | 382/159 |
| 9,542,363 | B2* | 1/2017 | Barber | G06F 40/106 |
| 2005/0132278 | A1* | 6/2005 | Yoshida | G06F 16/84 |
| | | | | 715/239 |
| 2007/0130176 | A1* | 6/2007 | Kawabe | G06F 40/186 |
| 2008/0098299 | A1* | 4/2008 | Odagiri | G06F 40/154 |
| | | | | 715/239 |
| 2009/0019064 | A1* | 1/2009 | Takafuji | G06F 16/35 |
| 2009/0070295 | A1* | 3/2009 | Otomori | G06F 40/143 |
| 2009/0137202 | A1* | 5/2009 | Fujimaki | G06F 40/14 |
| | | | | 455/3.01 |
| 2011/0082848 | A1* | 4/2011 | Goldentouch | G06F 16/9535 |
| | | | | 707/706 |
| 2013/0179772 | A1* | 7/2013 | Nakamura | G06F 40/151 |
| | | | | 715/234 |

OTHER PUBLICATIONS

Japanese Office Action dated Aug. 6, 2019 issued in the corresponding Japanese Patent Application No. 2018-227935.
Decision to Grant dated Dec. 10, 2019 issued in the corresponding Japanese Patent Application No. 2018-227935.
International Search Report (ISR) dated Dec. 17, 2019 filed in PCT/JP2019/039203.

* cited by examiner

FIG. 5

(a)
■ MANUAL MANAGEMENT TABLE
MAIN DATA ITEM
  MAIN INFORMATION: COMPANY No., CATEGORY No., LANGUAGE No., MANUAL ID, UPDATE ID, NODE INFORMATION (NODE ID), PART ID, CREATOR ID, CREATION DATE, UPDATER ID, UPDATE DATE, OTHERS
  META INFORMATION: VERSION, LANGUAGE CLASSIFICATION, BOOK CODE, ATTRIBUTE, TITLE, SUBTITLE, VERSION, NUMBER, NOTE
  ATTRIBUTE INFORMATION: LISTS OF PART ATTRIBUTE NAME AND PART ATTRIBUTE VALUE, OTHERS
  VARIABLE INFORMATION: LISTS OF VARIABLE NAME AND VARIABLE VALUE, OTHERS
  REFERENCE INFORMATION: LISTS OF PART ID AND NODE ID, OTHERS
  DERIVED INFORMATION: RELATION BETWEEN ORIGINAL MANUAL (CATEGORY No., MANUAL ID) AND ORIGINAL ~420

(b)
■ PART MANAGEMENT TABLE
MAIN DATA ITEM
  MAIN INFORMATION: COMPANY No., CATEGORY No., PART ID, PART TYPE, INITIAL PART ATTRIBUTE, CREATOR ID, CREATION DATE, UPDATER ID, UPDATE DATE, OTHERS
  VARIABLE INFORMATION: LIST OF VARIABLE NAMES, OTHERS
  CONDITION INFORMATION: LISTS OF ITEM NAME AND ITEM VALUE (CONDITION) ~430

(c)
■ PART MANAGEMENT TABLE
MAIN DATA ITEM
  MAIN INFORMATION: COMPANY No., CATEGORY No., PART ID, LANGUAGE No., UPDATE No., XML DATA, CREATOR ID, CREATION DATE, UPDATER ID, UPDATE DATE, OTHERS
  UPDATE INFORMATION: UPDATE No., XML DATA, UPDATER ID, UPDATE DATE, OTHERS (PRE-UPDATE INFORMATION WHEN UPDATING) ~440

FIG. 6

(a)
■ IMAGE MANAGEMENT TABLE
MAIN DATA ITEM
  MAIN INFORMATION: IMAGE No., COMPANY No., LANGUAGE No., UPDATE No., REPLACEMENT CHARACTER, CLASSIFICATION, OTHERS
  CONDITION INFORMATION: LISTS OF ITEM NAME AND ITEM VALUE (CONDITION)
  REFERENCE INFORMATION: EDITING SCREEN DATA, PDF DATA
  DERIVED INFORMATION: LIST OF REFERENCED UPDATE NoS. ~450

(b)
■ MATHEMATICAL FORMULA MANAGEMENT TABLE
MAIN DATA ITEM
  MAIN INFORMATION: MATHEMATICAL FORMULA No., COMPANY No., LANGUAGE No., UPDATE No., REPLACEMENT CHARACTER, CLASSIFICATION, OTHERS
  CONDITION INFORMATION: LISTS OF ITEM NAME AND ITEM VALUE (CONDITION)
  REFERENCE INFORMATION: EDITING SCREEN DATA, PDF DATA
  DERIVED INFORMATION: LIST OF REFERENCED NEW NoS. ~460

(c)
■ VERSION MANAGEMENT TABLE
MAIN DATA ITEM
  MAIN INFORMATION: UPDATE ID, UPDATE No., VERSION, CREATOR ID, CREATION DATE, UPDATER ID, UPDATE DATE, OTHERS ~470

FIG. 9
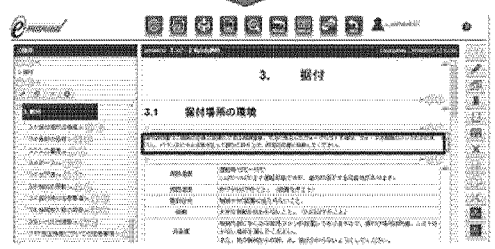
FIG. 10
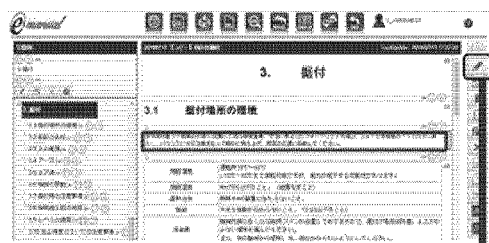

FIG. 17
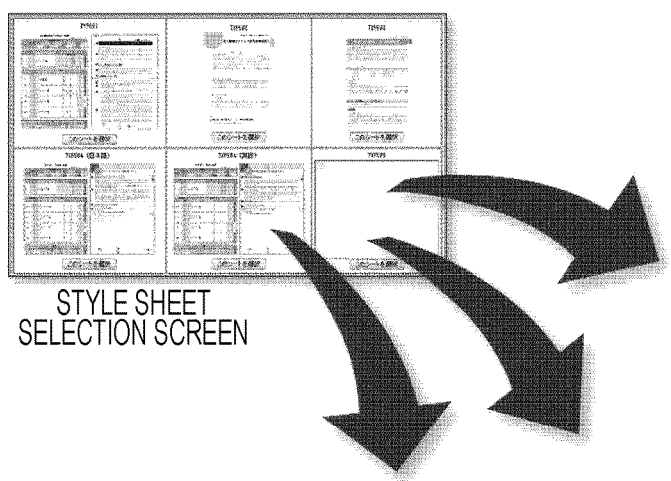
STYLE SHEET SELECTION SCREEN
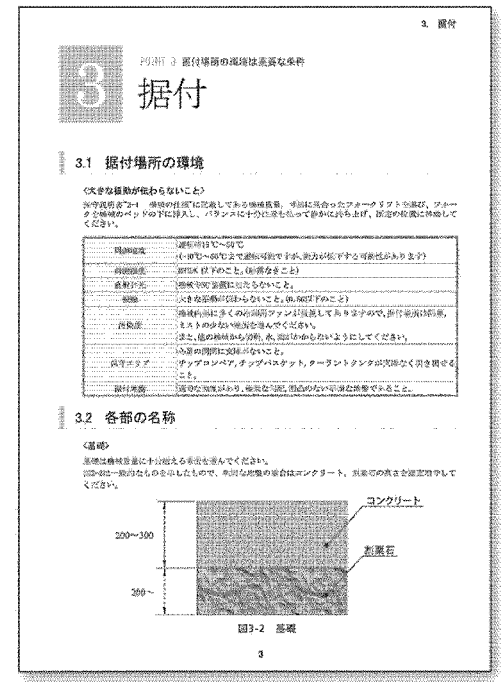
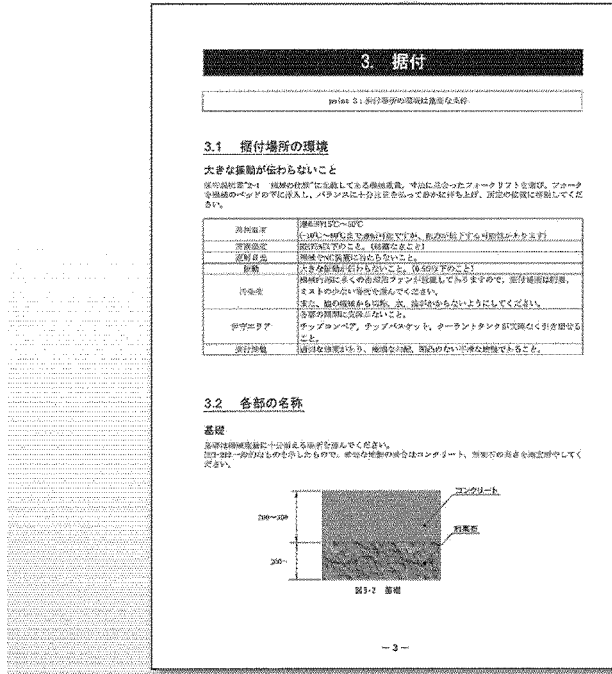
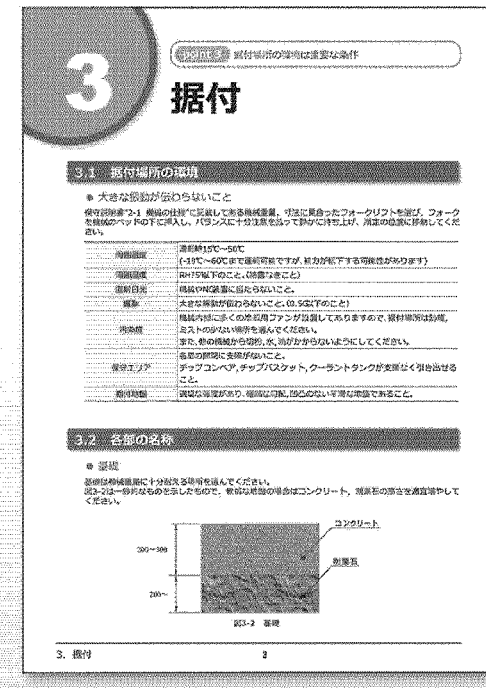

DOCUMENT CREATION SUPPORT SYSTEM

TECHNICAL FIELD

The present invention relates to a system for supporting creation of a document, and particularly relates to a document creation support system that can effectively find a necessary part.

BACKGROUND ART

Conventionally, for example, a technique described in Patent Literature 1 has been known as a technique for creating a document. The technique described in Patent Literature 1 is a document creation device that forms a document structure from a framework structure of the entire document and sentence element pieces for being embedded in the framework structure. In document creation, the document creation device performs selection from many various kinds of the sentence element pieces prepared in advance in accordance with a required specification and repeats the embedding in the framework structure, thereby creating a document ([0013] to [0031] and FIGS. 1 to 21 of Patent Literature 1).

CITATION LIST

Patent Literature

PATENT LITERATURE 1: Japanese Unexamined Patent Publication No. 2001-331481

SUMMARY OF THE INVENTION

Technical Problem

However, the technique described in Patent Literature 1 has had a problem in which as the number of the sentence element pieces increases, finding a sentence element piece desired to be used (part) is difficult.

Therefore, the present invention is made by focusing on such an unsolved problem of conventional techniques, and an object thereof is to provide a document creation support system that can effectively find a necessary part.

Solution to the Problem

[Invention 1] In order to achieve the above-described objective, a document creation support system of Invention 1 comprises: a part storage means that stores a part comprised of one or multiple elements; a node information storage means that stores node information specifying an arrangement order or hierarchical relationship of the part by document; a structured data generation means that generates structured data structuring the part, based on the part of the part storage means and the node information of the node information storage means; a template storage means that stores a layout template specifying a layout of the part; a document generation means that generates the document, based on the structured data generated in the structured data generation means and the layout template of the template storage means; a part attribute information storage means that stores part attribute information related to an attribute of the part, in association with the document; and a part search means that, via the part attribute information of the part attribute information storage means corresponding to a search key, searches the part storage means for the part used in the document corresponding to the part attribute information.

According to such a configuration, the structured data generation means generates the structured data, based on the part of the part storage means and the node information of the node information storage means, and the document generation means generates the document, based on the generated structured data and the layout template of the template storage means. In addition, the part search means, via the part attribute information of the part attribute information storage means corresponding to the search key, searches the part storage means for the part used in the document corresponding to the part attribute information.

In this regard, the elements include, for example, characters, numbers, codes, symbols, terms and other texts, images (including still images and moving images), mathematical formulas, tables, figures, graphs, footnotes, columns, page numbers, titles, body texts, or audio. Hereinafter, the same applies to a document creation support system of Invention 8.

In addition, the part storage means stores the part by any means and at any time. The part may be stored in advance, or the part may be stored by input from the outside or the like at the time of an operation of the present system without storing the part in advance. Hereinafter, the storage of information in the storage means will be the same.

In addition, the present system may be realized as a single device, terminal or other equipment, or may be realized as a network system to which multiple devices, terminals, or other pieces of equipment are communicably connected. In the case of the latter, respective constituent elements may belong to any of the multiple pieces of equipment and the like as long as they are communicably connected with one another. Hereinafter, the same applies to the document creation support system of Invention 8.

[Invention 2] Furthermore, the document creation support system of Invention 2 is the document creation support system of Invention 1, comprising a part aggregation means that determines, as to a first part and second part of the part storage means, each difference portion from the other and aggregates the first part and the second part as the one part in which the difference portions of the first part and the second part are replaced with reference information.

According to such a configuration, the part aggregation means determines, as to the first part and second part of the part storage means, each difference portion from the other and aggregates the first part and the second part as one part in which the difference portions of the first part and the second part are replaced with the reference information.

[Invention 3] Furthermore, the document creation support system of Invention 3 is the document creation support system of Invention 2, comprising a variable information storage means that stores variable information specifying variable identification information and variable content information, in association with the document, wherein the part aggregation means registers in the variable information storage means, the variable identification information as the reference information, and the variable content information related to the difference portion of the first part, in association with the document in which a part aggregating the first part is used, and registers in the variable information storage means, the variable identification information as the reference information, and the variable content information related to the difference portion of the second part, in association with the document in which a part aggregating the second part is used, and the document generation means converts the variable identification information included in the part into variable content information corresponding to the variable identification information, based on variable information of the document to be generated among the variable information of the variable information storage means.

According to such a configuration, the part aggregation means registers in the variable information storage means, the variable identification information and the variable content information related to the difference portion of the first part, in association with the document in which the part aggregating the first part is used. In addition, the part aggregation means registers in the variable information storage means, the variable identification information and the variable content information related to the difference portion of the second part, in association with the document in which the part aggregating the second part is used. Furthermore, the document generation means converts the variable identification information included in the element into the variable content information corresponding to the variable identification information, based on the variable information of the document to be generated among the variable information of the variable information storage means.

Here, the variable identification information is information for identification and can be configured as, for example, link information such as names, numbers, IDs, codes, and URLs. In addition, the variable identification information can be configured as, for example, characters, numbers, figures, codes, symbols, images, and other information.

In addition, the variable content information is information for replacing the variable identification information, which can adopt any information and be configured as, for example, link information such as names, numbers, IDs, codes, and URLs.

[Invention 4] Furthermore, the document creation support system of Invention 4 is the document creation support system of either Invention 2 or Invention 3, comprising an element storage means that stores the element, wherein the part aggregation means replaces the common element included in the difference portions of the first part and the second part with the reference information for identifying this, and the document generation means acquires the element from the element storage means, based on the reference information included in the part and generates the document, based on the acquired element.

According to such a configuration, the part aggregation means replaces the common element included in the difference portions of the first part and the second part with the reference information. Then, the document generation means acquires the element from the element storage means, based on the reference information included in the part and generates the document, based on the acquired element.

Here, the reference information is information for identifying the element and can be configured as, for example, link information such as names, numbers, IDs, codes, and URLs. In addition, the reference information can be configured as, for example, characters, numbers, figures, codes, symbols, images, and other information.

[Invention 5] Furthermore, the document creation support system of Invention 5 is the document creation support system of any one of Invention 2 to Invention 4, comprising a search key acquisition means that acquires the part attribute information of the part attribute information storage means corresponding to the document during creation, as the search key, and the part aggregation means aggregates the part used in the document during creation, and the part searched by the part search means, as the one part.

According to such a configuration, the search key acquisition means acquires the part attribute information of the part attribute information storage means corresponding to the document during creation, as the search key, and the part search means searches, via the part attribute information of the part attribute information storage means corresponding to the acquired search key, the part storage means for the part used in the document corresponding to the part attribute information. Furthermore, the part aggregation means aggregates the part used in the document during creation, and the searched part, as one part.

Here, the search key acquisition means may, for example, input the search key from an input device or the like, obtain or receive the search key from an external terminal or the like, read out the search key from a storage device, a storage medium, or the like, or generate or calculate the search key by information processing or the like. Accordingly, the acquisition includes at least input, obtainment, reception, readout (including search), generation, and calculation. Hereinafter, the concept of the acquisition will be the same.

[Invention 6] Furthermore, the document creation support system of Invention 6 is the document creation support system of Invention 5, comprising: a term conversion information storage means that stores term conversion information including a conversion object term to be converted and a standard term that should be standardized after conversion; and a term conversion means that converts the conversion object term included in the part used in the document during creation into the standard term, based on the term conversion information of the term conversion information storage means, wherein the part aggregation means aggregates the part whose term is converted by the term conversion means, and the part searched by the part search means, as the one part.

According to such a configuration, the term conversion means converts the conversion object term included in the part used in the document during creation into the standard term, based on the term conversion information of the term conversion information storage means. Furthermore, the part aggregation means aggregates the part whose term is converted and the searched part, as one part.

[Invention 7] Furthermore, the document creation support system of Invention 7 is the document creation support system of any one of Invention 1 to Invention 6, comprising: a document storage means that stores the document; a document selection means that selects the document to be based on when creation from the documents of the document storage means; a part attribute information acquisition means that acquires the part attribute information; a difference portion determination means that determines, as to, among the documents of the document storage means, the multiple documents corresponding to the part attribute information acquired by the part attribute information acquisition means, a difference portion common per the part; and a document configuration means that adds the common difference portion determined by the difference portion determination means to the document selected by the document selection means and thus configures the document to be created.

According to such a configuration, the document selection means selects the document to be based on when creation, and the part attribute information acquisition means acquires the part attribute information. Then, the difference portion determination means determines, as to the multiple documents corresponding to the acquired part attribute information, the common difference portion. Furthermore, the document configuration means adds the determined common difference portion to the selected document and thus configures the document to be created.

[Invention 8] Furthermore, the document creation support system of Invention 8 comprises: a document storage means that stores a document that uses a part composed of one or multiple elements, and part attribute information related to an attribute of the part, to be associated with each other; a document selection means that selects the document to be based on when creation from the documents of the document storage means; a part attribute information acquisition means that acquires the part attribute information; a difference portion determination means that determines, as to, among the documents of the document storage means, the multiple documents corresponding to the part attribute information acquired by the part attribute information acquisition means, a difference portion common per the part; and a document configuration means that adds the common difference portion determined by the difference portion determination means to the document selected by the document selection means and thus configures the document to be created.

According to such a configuration, the document selection means selects the document to be based on when creation, and the part attribute information acquisition means acquires the part attribute information. Then, the difference portion determination means determines, as to the multiple documents corresponding to the acquired part attribute information, the common difference portion. Furthermore, the document configuration means adds the common difference portion to the selected document and thus configures the document to be created.

Advantages of the Invention

As has been described above, according to the document creation support system of Invention 1, via the part attribute information corresponding to the search key, the part used in the document corresponding to the part attribute information is searched for, and accordingly a necessary part can be effectively found as compared to conventional techniques.

Furthermore, according to the document creation support system of Invention 2, the parts can be aggregated, and accordingly it is possible to suppress an increase in the parts having similar contents.

Furthermore, according to the document creation support system of Invention 3, a context common in the multiple documents can be applied with the variable content information corresponding to the document.

Furthermore, according to the document creation support system of Invention 4, one element can be used for multiple locations, and changes of the element also become easier.

Furthermore, according to the document creation support system of Invention 5, the part related to the document during creation can be obtained by search, and the part used in the document during creation is aggregated with this. Thus, it is possible to effectively aggregate the parts.

Furthermore, according to the document creation support system of Invention 6, the parts can be aggregated after the term standardization.

Furthermore, according to the document creation support system of Invention 7 or 8, only updating the difference portion can create the document.

BRIEF DESCRIPTION OF THE DRAWINGS

FIG. 5 is a figure illustrating data structures of a manual management table 420 and part management tables 430 and 440.

FIG. 6 is a figure illustrating data structures of an image management table 450, a mathematical formula management table 460, and a version management table 470.

FIG. 9 is a screen illustrating operations of adding a part.

FIG. 10 is a screen illustrating operations of changing a part content.

FIG. 13 is a figure illustrating a procedure in the case of performing aggregation of images or the like.

FIG. 17 is a figure for explaining realization of various layouts by layout template.

DESCRIPTION OF EMBODIMENTS

Hereinafter, an embodiment of the present invention will be described. FIG. 1 to FIG. 17 are figures illustrating the present embodiment.

Figure 1:
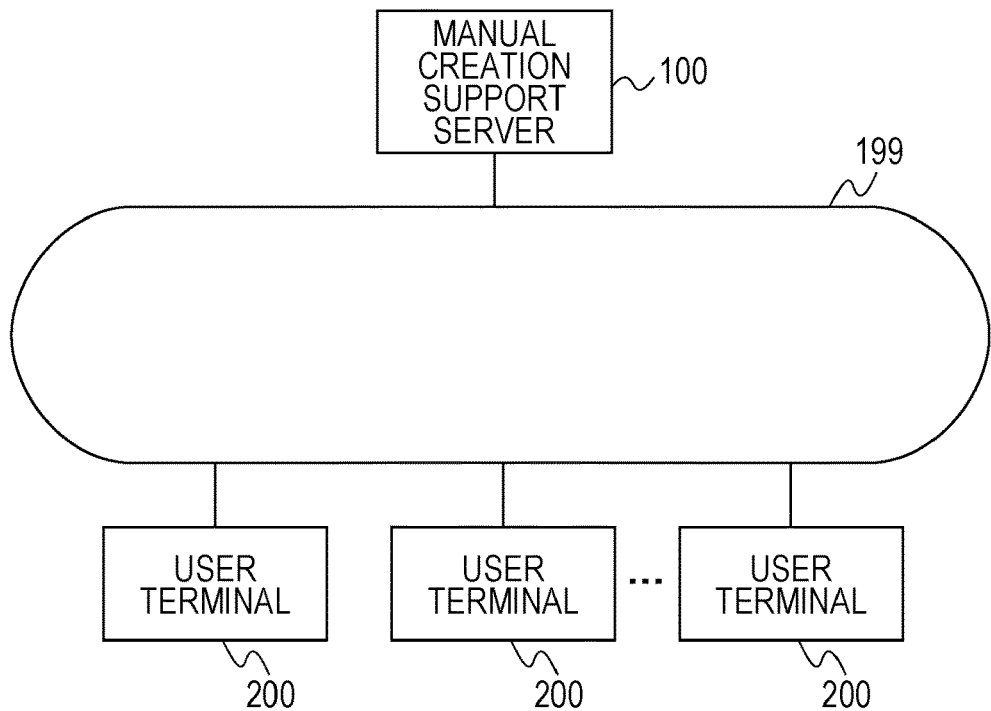
FIG. 1 is a block diagram illustrating a configuration of a network system related to the present embodiment.

Firstly, a configuration of the present embodiment will be explained. FIG. 1 is a block diagram illustrating a configuration of a network system related to the present embodiment.

As illustrated in FIG. 1, an Internet 199 is connected to a manual creation support server 100 that supports manual creation and a user terminal 200 that is installed per company.

Figure 2:
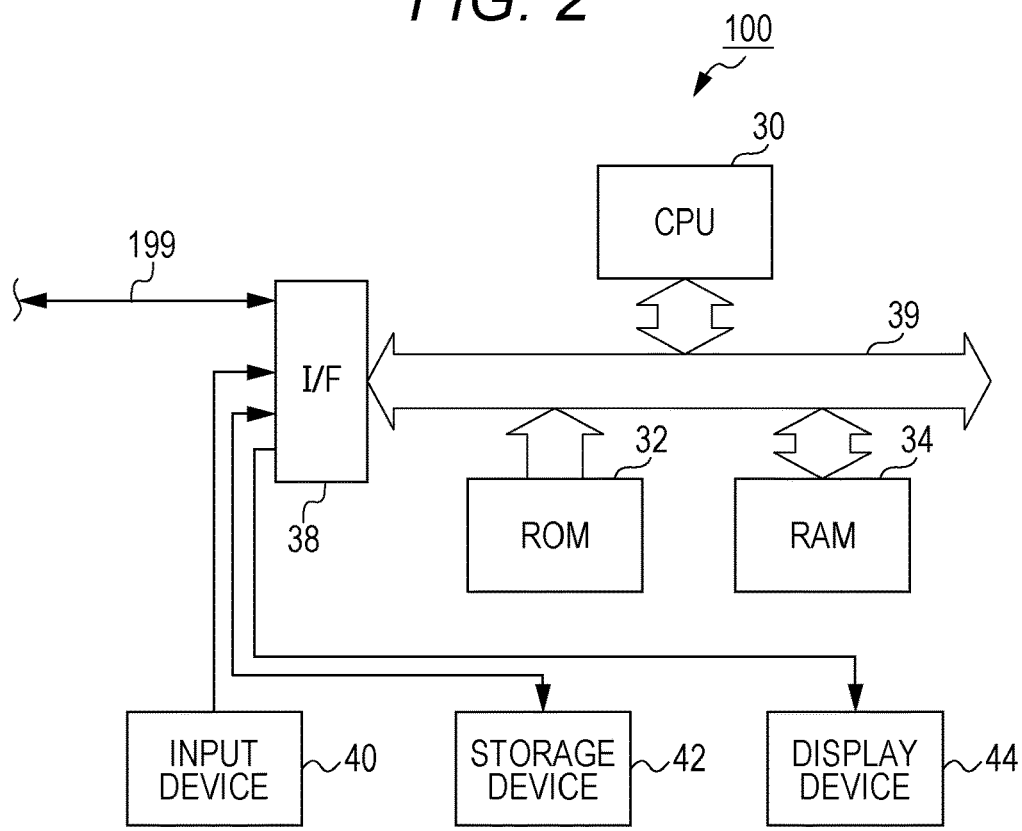
FIG. 2 is a figure illustrating a hardware configuration of a manual creation support server 100.

Next, a configuration of the manual creation support server 100 will be explained. FIG. 2 is a figure illustrating a hardware configuration of the manual creation support server 100.

As illustrated in FIG. 2, the manual creation support server 100 is composed of a central processing unit (CPU) 30 that controls arithmetic calculation and an entire system based on a control program, a read only memory (ROM) 32 that stores the control program or the like of the CPU 30 in a prescribed region in advance, a random access memory (RAM) 34 that stores data read out from the ROM 32 or the like and the result of arithmetic calculation that is necessary in the process of arithmetic calculation of the CPU 30, and an interface (I/F) 38 that mediates input and output of data to an external device, and these are mutually connected in a manner capable of transferring data by a bus 39 that is a signal line for transferring data.

The I/F 38 is connected to an input device 40 consisting of a keyboard, a mouse, and the like that are capable of inputting data as human interfaces, a storage device 42 that stores data, table, and the like as files, a display device 44 that displays a screen based on an image signal, and a signal line for connection to the Internet 199, as external devices.

Figure 3:
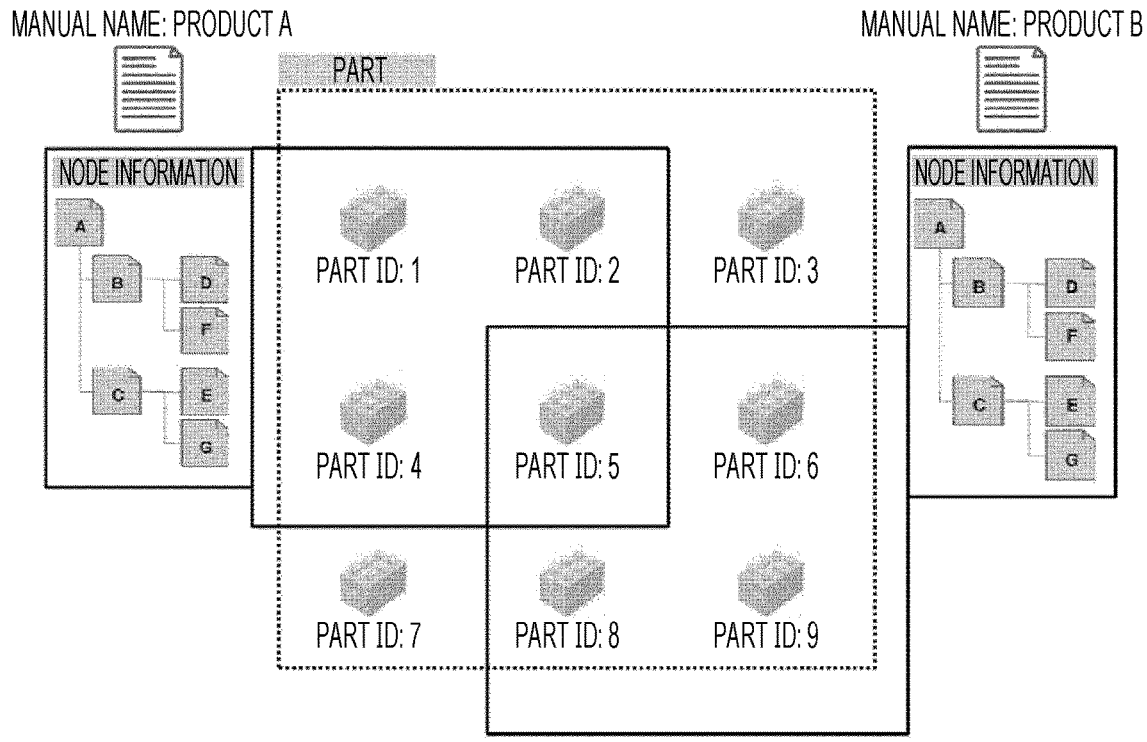
FIG. 3 is a figure illustrating a relation between a manual, node information, and a part.

Next, a data structure of the storage device 42 will be explained. FIG. 3 is a figure illustrating a relation between a manual, node information, and a part.

The manual creation support server 100 can create the manual in which the elements that are terms, sentences, images, mathematical formulas, or others are created by part. Therefore, as illustrated in FIG. 3, the manual has one or multiple parts and the node information specifying an arrangement order or hierarchical relationship of the parts. In the example of FIG. 3, the manual of a "product A" is made of parts 1, 2, 4, and 5, and the arrangement order or hierarchical relationship of these parts is specified by the node information. In addition, the manual of a "product B" is made of parts 5, 6, 8, and 9, and the arrangement order or hierarchical relationship of these parts is specified by the node information. In this regard, the part 5 is shared between the manual of the "product A" and the manual of the "product B".

The manual is managed per company and per category. An image library registers multiple images. A mathematical formula library registers multiple mathematical formulas. A part library registers multiple parts composed of one or multiple elements (terms, sentences, images, mathematical formulas, or other elements). Attributes can be set in the parts, and an attribute library registers multiple attributes.

Figure 4:
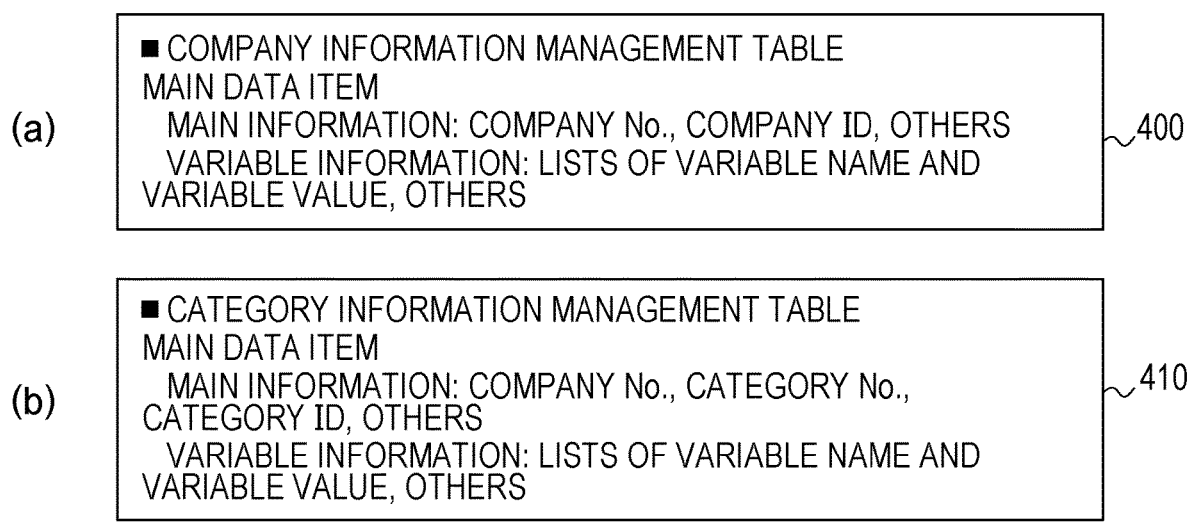
FIG. 4 is a figure illustrating data structures of a company information management table 400 and a category information management table 410.

FIG. 4 is a figure illustrating data structures of a company information management table 400 and a category information management table 410.

As illustrated in FIG. 4, the storage device 42 stores the company information management table 400 that manages company information and the category information management table 410 that manages category information.

As illustrated in FIG. 4(*a*), the company information management table 400 registers one record per company. Each record registers main information composed of a company No., a company ID, and other information and variable information composed of a list registered in association with a variable name and a variable value and other information. It should be noted that the No. is an internal number for system implementation. On the other hand, the ID is included in data as an external specification. The No. is always a numerical value, but the ID includes characters other than numbers. In addition, the No. is always unique in the system, but some different language Nos. have the same ID.

As illustrated in FIG. 4(*b*), the category information management table 410 registers one record per company and per category. Each record registers main information composed of a company No., a category No., a category ID, and other information and variable information composed of a list registered in association with a variable name and a variable value and other information.

FIG. 5 is a figure illustrating data structures of a manual management table 420 and part management tables 430 and 440.

Furthermore, as illustrated in FIG. 5, the storage device 42 stores the manual management table 420 that manages the manual and the part management tables 430 and 440 that manage the parts of the part library.

As illustrated in FIG. 5(*a*), the manual management table 420 registers one record per manual. Each record registers: main information composed of a company No., a category No., a language No., a manual ID, an update ID, node information (node ID), a part ID, a creator ID, a creation date, an updater ID, an update date, and other information; meta information composed of a version, a language classification, a book code, an attribute, a title, a subtitle, a version, a number, and a note; attribute information composed of a part attribute list registered in association with a part attribute name and a part attribute value, a term conversion list registered in association with a conversion object term to be converted and a standard term that should be standardized after conversion, and other information; variable information composed of a list registered in association with a variable name and a variable value and other information; reference information composed of a list of a part ID and a node ID and other information; and derived information composed of a relation between an original manual (category No. and manual ID) and an original.

The node information will be explained. An element that constitutes the manual is called the node, which has an ID uniquely identified in the manual. A portion where the node data (for example, texts) is stored is the part, which has an ID uniquely identified in the company. Assimilating the parts used in multiple manuals (same part ID) is called the aggregation, and the aggregated part is referred to from multiple nodes. In contrast, making the part used in one manual unique (another part ID) is called the separation, and the separated part is referred to from one node.

Copy of the manual (duplication) will be explained. The copy of the manual has three types of separation copy, aggregation copy, and development copy. The separation copy is to perform copy so as to use a unique part different from that of the manual that is the copy source. The aggregation copy (also referred to as the "reference copy") is to perform copy so as to use the same part as that of the manual that is the copy source. The development copy is to perform the aggregation copy with a change of the language classification or an assignment of an update ID (version).

A variable function will be explained. Since the manual has a context, part reuse is limited in a simple text. Describing a context dependent portion with a variable name and converting the variable name into a variable value upon manual output reduces dependency on the context. The variable value to the variable name is set per context. In the parts used in multiple manuals, the variable values that are set per manual to the variable name are listed as selection candidates. The variable value corresponding to the variable name is converted under situation combinations or item contents described later.

Situations (contexts) will be explained. For part reuse, data that is output in association with the following situations is set: part uniqueness; node uniqueness; manual uniqueness; category uniqueness; company uniqueness; media uniqueness; language uniqueness; and update (version) uniqueness.

Items (references and conditions) will be explained. Depending on how the part is used, part information, the manual meta information, the category information, and the company information can be referred to. The conditions can be set by combining the information to be referred to. The part information includes a section number, a section title, a figure number, a figure title, a table number, a table title, a number, a title number, a title content, an item number, an item name, and other information. The manual meta information includes a version, a language classification, a book code, an attribute, a title, a subtitle, a version, a number, a note, and a part attribute.

As illustrated in FIG. 5(*b*), the part management table 430 registers one record per part. Each record registers main information composed of a company No., a category No., a part ID, a part type, an initial part attribute, a creator ID, a creation date, an updater ID, an update date, and other information, variable information composed of a variable name list and other information, and condition information composed of a list registered in association with an item name and an item value (condition).

As illustrated in FIG. 5(c), the part management table 440 registers one record per updated part. Each record registers main information composed of a company No., a category No., a part ID, a language No., an update No., XML data, a creator ID, a creation date, an updater ID, an update date, and other information and update information composed of an update No., XML data, an updater ID, an update date, and other information (pre-update information when updating). A manual described in a different language is managed by associating a part used in the second language manual with a part used in the first language manual. Parts with the same node are set to the same part ID and are distinguished by the language Nos. In the example of FIG. 3, for example, when a Japanese manual Mjp and an English manual Men exist for the manual of the product A, the manual Mjp uses parts whose part IDs are "1", "2", "4", and "5", and the manual Men has node information whose structure is the same as that of the manual Mjp and uses parts corresponding to each part of the manual Mjp. In each part of the manual Mjp and each part of the manual Men, parts with the same node are set to the same part ID to be associated with each other. Accordingly, the manual Men uses parts whose part IDs are "1", "2", "4", and "5". However, the parts used in the manual Mjp are set to a language No. that corresponds to Japanese, and the parts used in the manual Men are set to a language No. that corresponds to English, thereby being distinguished from each other.

FIG. 6 is a figure illustrating data structures of an image management table 450, a mathematical formula management table 460, and a version management table 470.

Furthermore, as illustrated in FIG. 6, the storage device 42 stores the image management table 450 that manages the images of the image library, the mathematical formula management table 460 that manages the mathematical formulas of the mathematical formula library, and the version management table 470 that manages a manual version.

As illustrated in FIG. 6(a), the image management table 450 registers one record per image. Each record registers main information composed of an image No., a company No., a language No., an update No., a replacement character, a classification, and other information, condition information composed of a list registered in association with an item name and an item value (condition), reference information composed of editing screen data and PDF data, and derived information composed of a list of referenced update Nos.

A replacement function will be explained. Image data such as figures and mathematical formulas needs to be replaced, and the same image data is used at multiple locations. An image data portion is described with a replacement character, and converting the replacement character into image data upon manual output enables batch replacement of the image data, thereby reducing dependency of the part on the image data. Unlike variables, the replacement character and the image data are managed as a library per company. The image data per language classification can be registered in the same replacement character string and is converted under conditions of situation combinations or items described later.

As illustrated in FIG. 6(b), the mathematical formula management table 460 registers one record per mathematical formula. Each record registers main information composed of a mathematical formula No., a company No., a language No., an update No., a replacement character, a classification, and other information, condition information composed of a list registered in association with an item name and an item value (condition), reference information composed of editing screen data and PDF data, and derived information composed of a list of referenced update Nos.

As illustrated in FIG. 6(c), the version management table 470 registers one record per version. Each record registers main information composed of an update ID, an update No., a version, a creator ID, a creation date, an updater ID, an update date, and other information.

The storage device 42 further stores a layout template specifying a part layout. In manual creation, a layout template to which a layout is applied is designated.

Next, operations in the present embodiment will be explained. Firstly, operations in the case of creating the manual will be explained.

Figure 7:
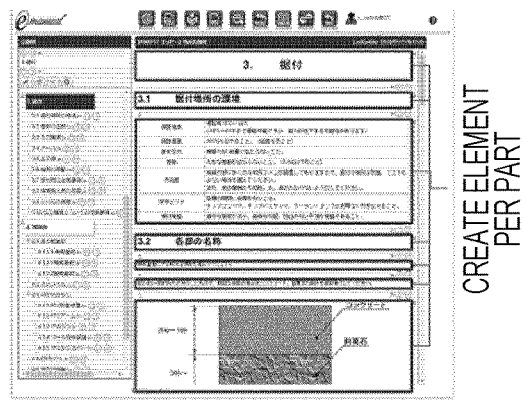
FIG. 7 is a figure for explaining a manual creation outline.

FIG. 7 is a figure for explaining a manual creation outline. As illustrated in FIG. 7, the manual is created by placement of the part in a layout region. The part is placed in a vertical or horizontal direction of the layout region. Firstly, one part is added to the layout region. Next part can be added immediately in front of or immediately behind the existing part. The same applies to subsequent parts, which can be added to any positions relative to the existing parts. The part can describe elements that are terms, sentences, images, mathematical formulas, or others and also can set a hierarchical relationship relative to other parts. In addition, a two-divided part exists, which is a part whose region is divided into two on the left and right sides, and each places texts, images, tables, items, and the like. In addition, a two-column part exists, which is a part whose region is divided into two on the left and right sides and places texts continuously from the left side to the right side. The part content can be changed and also deleted.

Figure 8:
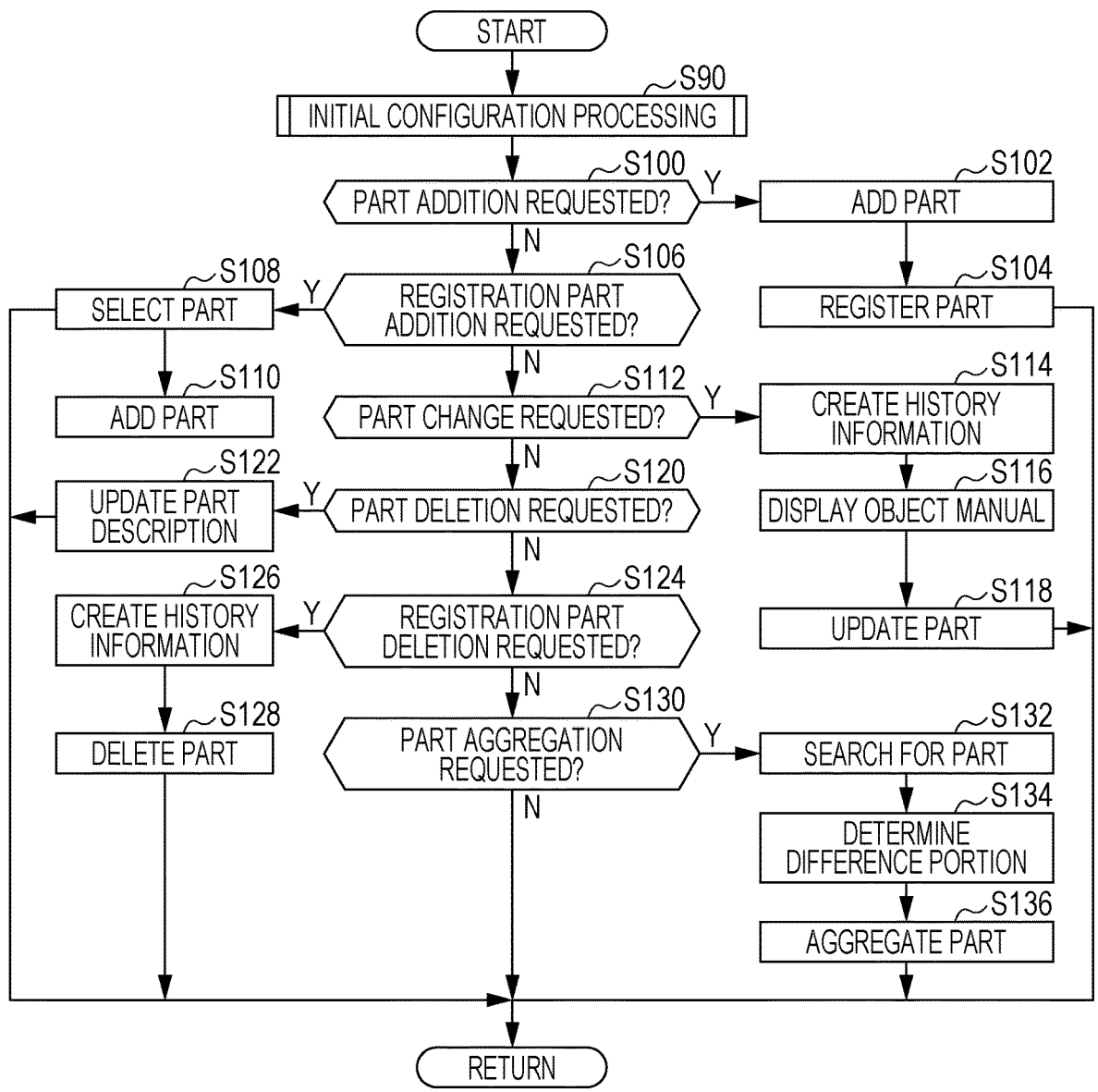
FIG. 8 is a flow chart illustrating manual creation processing.

FIG. 8 is a flow chart illustrating manual creation processing. The CPU 30 consists of a micro-processing unit (MPU) and the like. The CPU 30 activates a prescribed program stored in a prescribed region of the ROM 32 and executes the manual creation processing illustrated in the flow chart of FIG. 8 according to that program.

When the manual creation processing is executed in the CPU 30, firstly, a shift is made to Step S90 as illustrated in FIG. 8.

Step S90 is a processing that is executed only when a manual that a user intends to create (hereinafter referred to as the "creation object manual") is firstly created, which executes initial configuration processing that configures an initial content of the creation object manual. In the initial configuration processing, firstly, the user terminal 200 selects a manual to be based on for creation from the manuals in the manual management table 420 and selects a part attribute to be set in the creation object manual. Next, a difference portion common per part is determined in multiple manuals corresponding to the selected part attribute among the manuals in the manual management table 420. Furthermore, the determined common difference portion is added to the selected manual to be based on to configure the creation object manual.

Next, a shift is made to Step S100 in which whether a part addition request to add a new part has been performed by the user terminal 200 is determined. When it is determined that the part addition request has been performed (YES), a shift is made to Step S102.

FIG. 9 is a screen illustrating operations of adding a part. In the user terminal 200, on the screen illustrated in FIG. 9, a region where a part is placed is assigned to the right half of the layout region, and a region where a menu or the like is placed is assigned to the left half. When a "part insertion" button at a location into which a new part is desired to be inserted is clicked, a part addition request is transmitted to the manual creation support server 100.

In Step S102, a new part is added to the layout region, a description related to the new part is incorporated into the node information concerning the currently created manual, and a shift is made to Step S104. In Step S104, when a new element is described in the added part, the added part is registered in the part management table 440, and the series of processing are completed to return to the original processing.

On the other hand, when it is determined that the part addition request is not performed (NO) in Step S100, a shift is made to Step S106.

In Step S106, whether a registration part addition request to add a new part among the parts registered in the part management table 440 has been performed by the user terminal 200 is determined. When it is determined that the registration part addition request has been performed (YES), a shift is made to Step S108.

In Step S108, a list of the parts registered in the part management table 440 is presented to the user terminal 200. When a part is selected from the list of the parts, a shift is made to Step S110. In Step S110, the selected part is added to the layout region, a description related to the new part is incorporated into the node information concerning the currently created manual, and the series of processing are completed to return to the original processing.

On the other hand, when it is determined that the registration part addition request is not performed (NO) in Step S106, a shift is made to Step S112.

In Step S112, whether a part change request to change a content of a part that has been placed in the layout region has been performed by the user terminal 200 is determined. When it is determined that the part change request has been performed (YES), a shift is made to Step S114.

FIG. 10 is a screen illustrating operations of changing a part content. In the user terminal 200, as illustrated in FIG. 10, when an "edition" button on the right side of a part whose content is desired to be changed is clicked, a part change request is transmitted to the manual creation support server 100.

In Step S114, history information showing a content of the part before change is created, and the created history information is stored in the storage device 42. In this manner, the part can be restored based on the history information even after the content is changed. Furthermore, a shift is made to Step S116 in which the manual management table 420 is searched for node information concerning a part to be updated, and based on the searched node information, a list of object manuals using the part to be updated is presented to the user terminal 200 to prompt the user to confirm whether or not to perform the update. As a result of this, when a confirmation of the update is obtained, a shift is made to Step S118 in which the part to be updated among the parts registered in the part management table 440 is updated, and the series of processing are completed to return to the original processing. Once the part is updated, the update content is commonly reflected to the parts to be updated in multiple manuals using the part to be updated.

On the other hand, when it is determined that the part change request is not performed (NO) in Step S112, a shift is made to Step S120.

In Step S120, whether a part deletion request to delete a part that has been placed in the layout region has been performed by the user terminal 200 is determined. When it is determined that the part deletion request has been performed (YES), a shift is made to Step S122.

Figure 11:
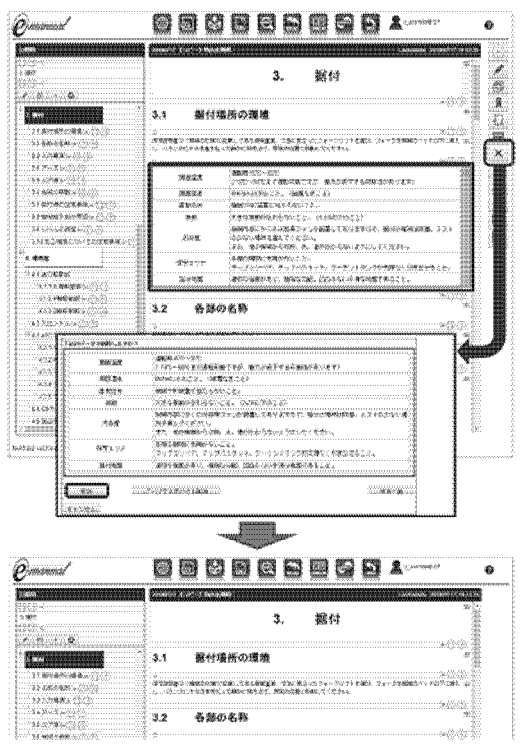
FIG. 11 is a screen illustrating operations of deleting a part.

FIG. 11 is a screen illustrating operations of deleting a part. In the user terminal 200, as illustrated in FIG. 11, when a "deletion" button on the right side of a part desired to be deleted is clicked, a part deletion request is transmitted to the manual creation support server 100.

In Step S122, without deletion of the part to be deleted, a description related to the part to be deleted is deleted from node information concerning the currently created manual, and the series of processing are completed to return to the original processing.

On the other hand, when it is determined that the part deletion request is not performed (NO) in Step S120, a shift is made to Step S124.

In Step S124, whether a registration part deletion request to delete a part registered in the part management table 440 has been performed by the user terminal 200 is determined. When it is determined that the registration part deletion request has been performed (YES), a shift is made to Step S126.

In Step S126, history information showing a content of the part before deletion is created, and the created history information is stored in the storage device 42. In this manner, the part can be restored based on the history information even after deletion. Furthermore, a shift is made to Step S128 in which the part to be deleted among the parts registered in the part management table 440 is deleted, and the series of processing are completed to return to the original processing.

On the other hand, when it is determined that the registration part deletion request is not performed (NO) in Step S124, a shift is made to Step S130.

In Step S130, whether a part aggregation request to aggregate parts has been performed by the user terminal 200 is determined. When it is determined that the part aggregation request has been performed (YES), a shift is made to Step S132.

In Step S132, the part management table 440 is searched for parts related to the part selected as an aggregation object in the manual during creation (hereinafter referred to as the "aggregation object part A"), a list of the searched parts is displayed, and the user terminal 200 selects one from the list. Specifically, a part attribute corresponding to the manual during creation is acquired from the manual management table 420, and via a part attribute of the manual management table 420 that coincides with the acquired part attribute, the part management table 440 is searched for a part used in the manual corresponding to the part attribute.

Next, a shift is made to Step S134 in which, as to the aggregation object part A and the part that is searched and selected in Step S132 (hereinafter referred to as the "aggregation object part B"), each difference portion from the other is determined.

Next, a shift is made to Step S136 in which, as to texts of the difference portions of the aggregation object parts A and B that are determined in Step S134, as one part in which the texts included in the difference portions of the aggregation object parts A and B are replaced with a variable name, the aggregation object parts A and B are aggregated. Furthermore, the manual management table 420 registers the variable name and a variable value showing the difference portion of the aggregation object part A, in association with the manual that uses the part aggregating the aggregation object part A, and the manual management table 420 registers the variable name and a variable value showing the difference portion of the aggregation object part B, in association with the manual that uses the part aggregating the aggregation object part B.

Figure 12:
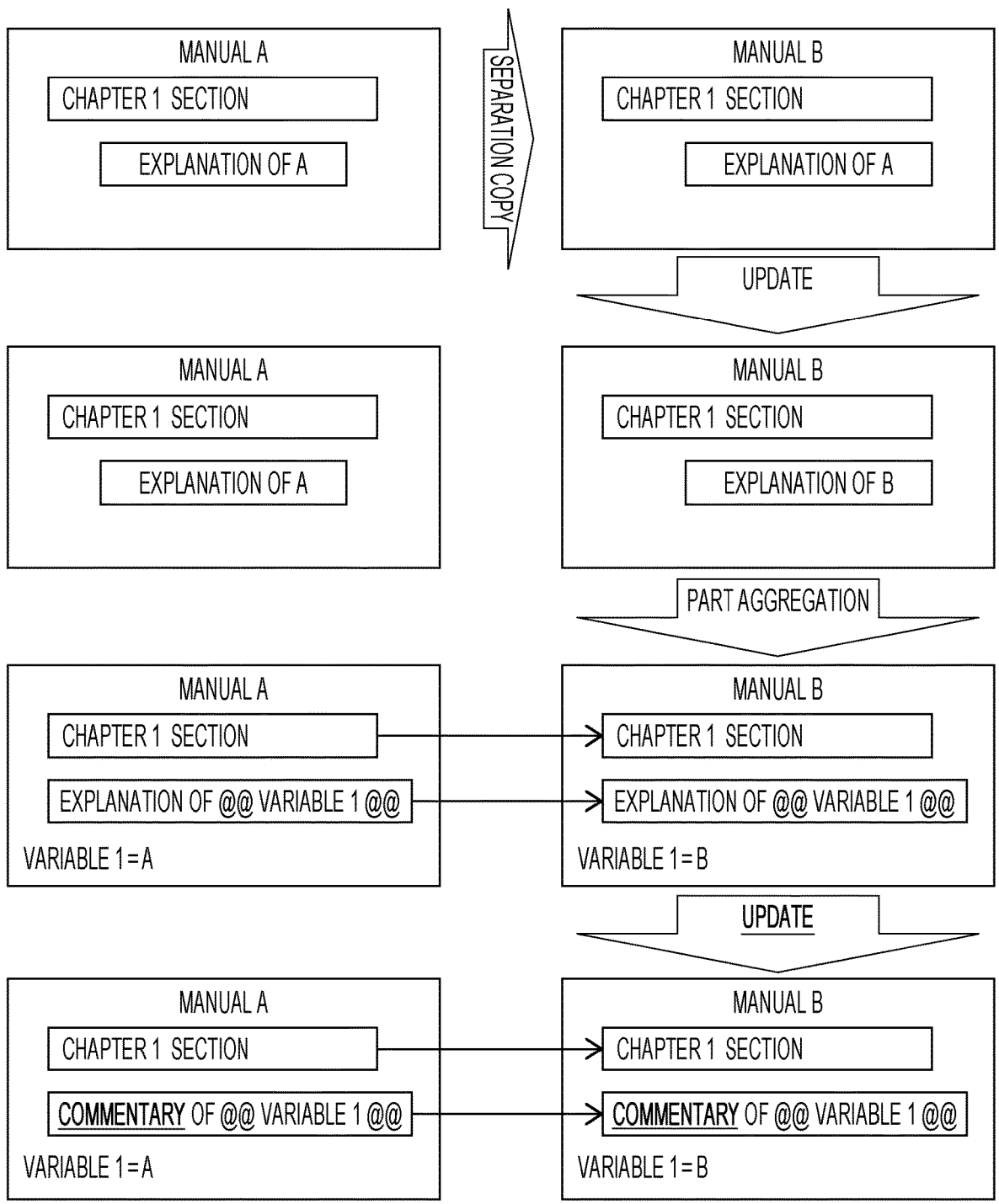
FIG. 12 is a figure illustrating a procedure in the case of performing aggregation of texts.

FIG. 12 is a figure illustrating a procedure in the case of performing aggregation of texts. In performing the aggregation of texts, for example, as illustrated in FIG. 12, a manual B is firstly created by separation copy of a manual A. Next, a location unique to the manual B is updated. Subsequently, part aggregation compares the manual A and the manual B in which the following processing is performed. Nodes with the same data portion use the same part. Nodes with a difference in the data portions use the same part after the difference portion is expressed by a variable (the variable name in the example of FIG. 12 is "variable 1"). After the aggregation, a change common between the manual A and the manual B can be done by one update.

In addition, in Step S136, as to images or the like of the difference portions of the aggregation object parts A and B that are determined in Step S134, as one part in which the images or the like with the same content included in the difference portions of the aggregation object parts A and B are replaced with a common replacement character, the aggregation object parts A and B are aggregated.

Figure 13:
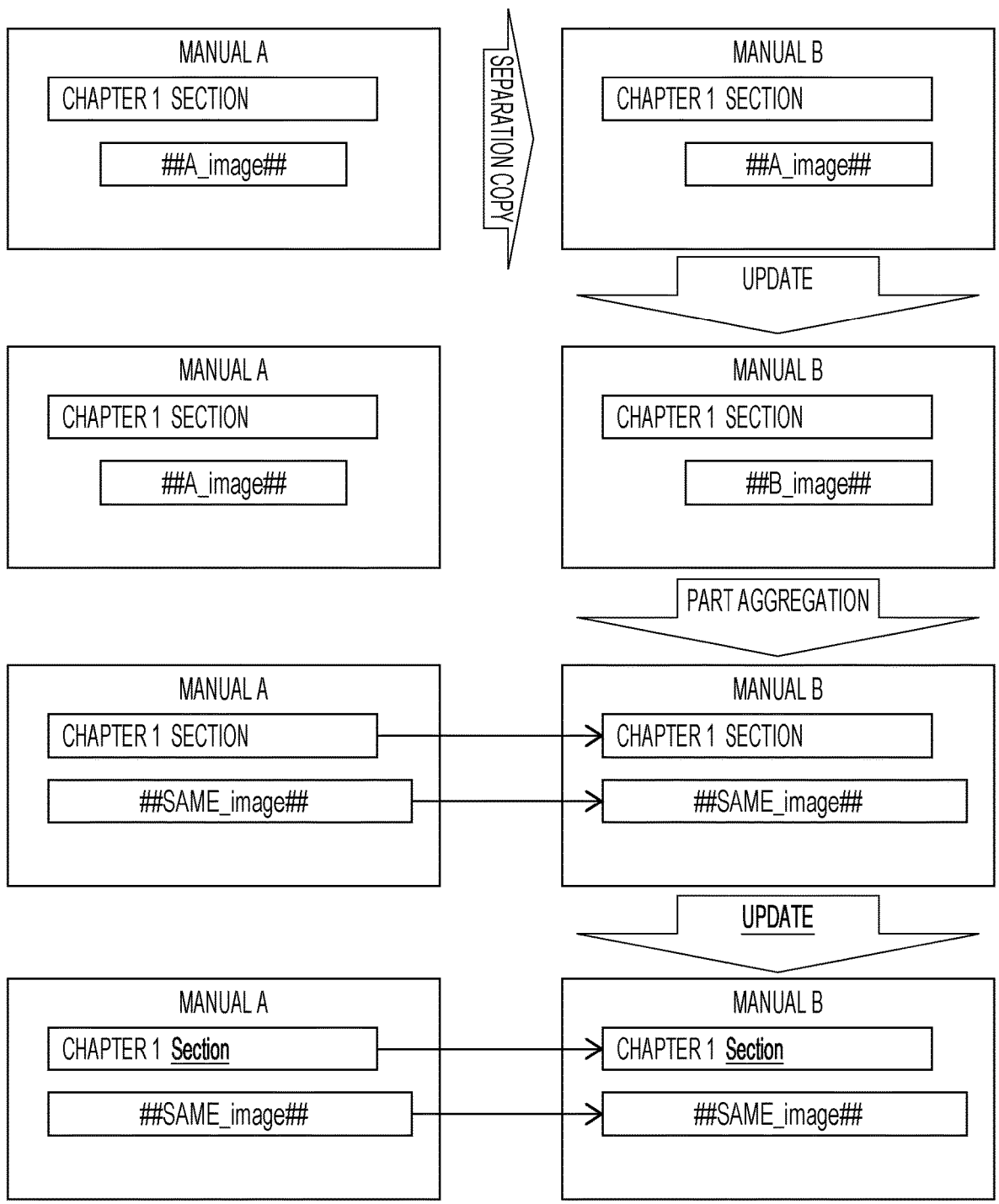

FIG. 13 is a figure illustrating a procedure in the case of performing aggregation of images or the like. In performing the aggregation of images or the like, for example, as illustrated in FIG. 13, a manual B is firstly created by separation copy of a manual A, and the image is updated. Next, update is made to an image that has been believed to be unique to the manual B. Next, part aggregation compares the manual A and the manual B in which the following processing is performed. Nodes with the same data portion use the same part. In the case of the same image data, after the change into the same replacement character ("SAME image" in the example of FIG. 13), the same part is used. After the aggregation, a change common between the manual A and the manual B can be done by one update.

Upon completion of the processing in Step S136, the series of processing are completed to return to the original processing. Next, operations in the case of performing input assistance (aggregation search) will be explained.

Figure 14:
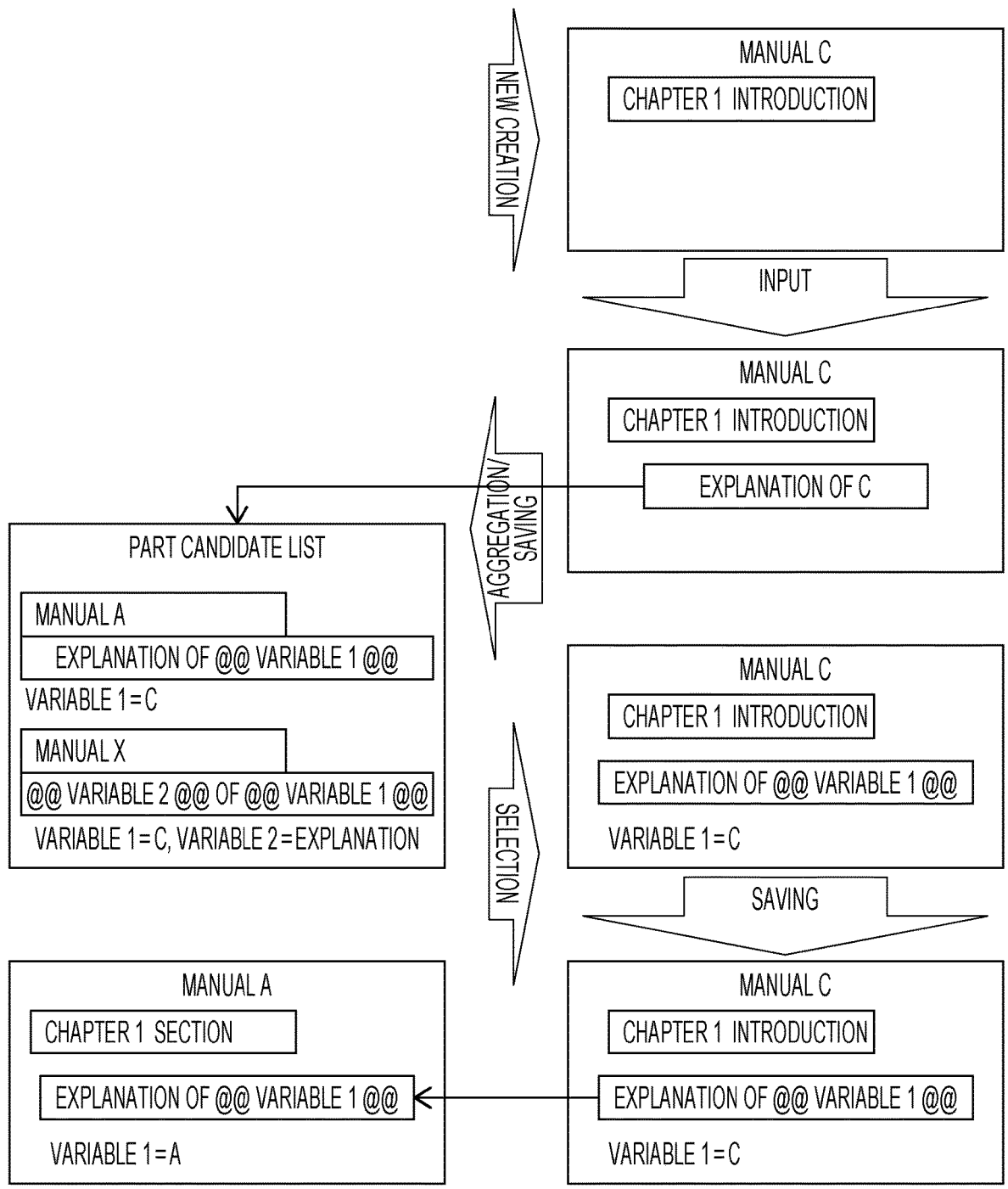
FIG. 14 is a figure illustrating a procedure in the case of performing input assistance (aggregation search).

FIG. 14 is a figure illustrating a procedure in the case of performing the input assistance (aggregation search). In describing a part, the input assistance (aggregation search) can be performed. In performing the input assistance (aggregation search), for example, as illustrated in FIG. 14, a manual C is newly created at first. Next, a block is newly added to input a text. Subsequently, operating aggregation searches for a part using a part attribute possessed by the manual C as a search key, and part candidates usable by a variable function and a replacement function are listed to the input text. This search processing is the same as the processing in Step S132. Furthermore, the variable function and the replacement function perform the processing so that the selected part can be used.

It should be noted that the example of FIG. 14 illustrates only the variable function. Next, operations in the case of performing input assistance (term standardization) will be explained.

Figure 15:
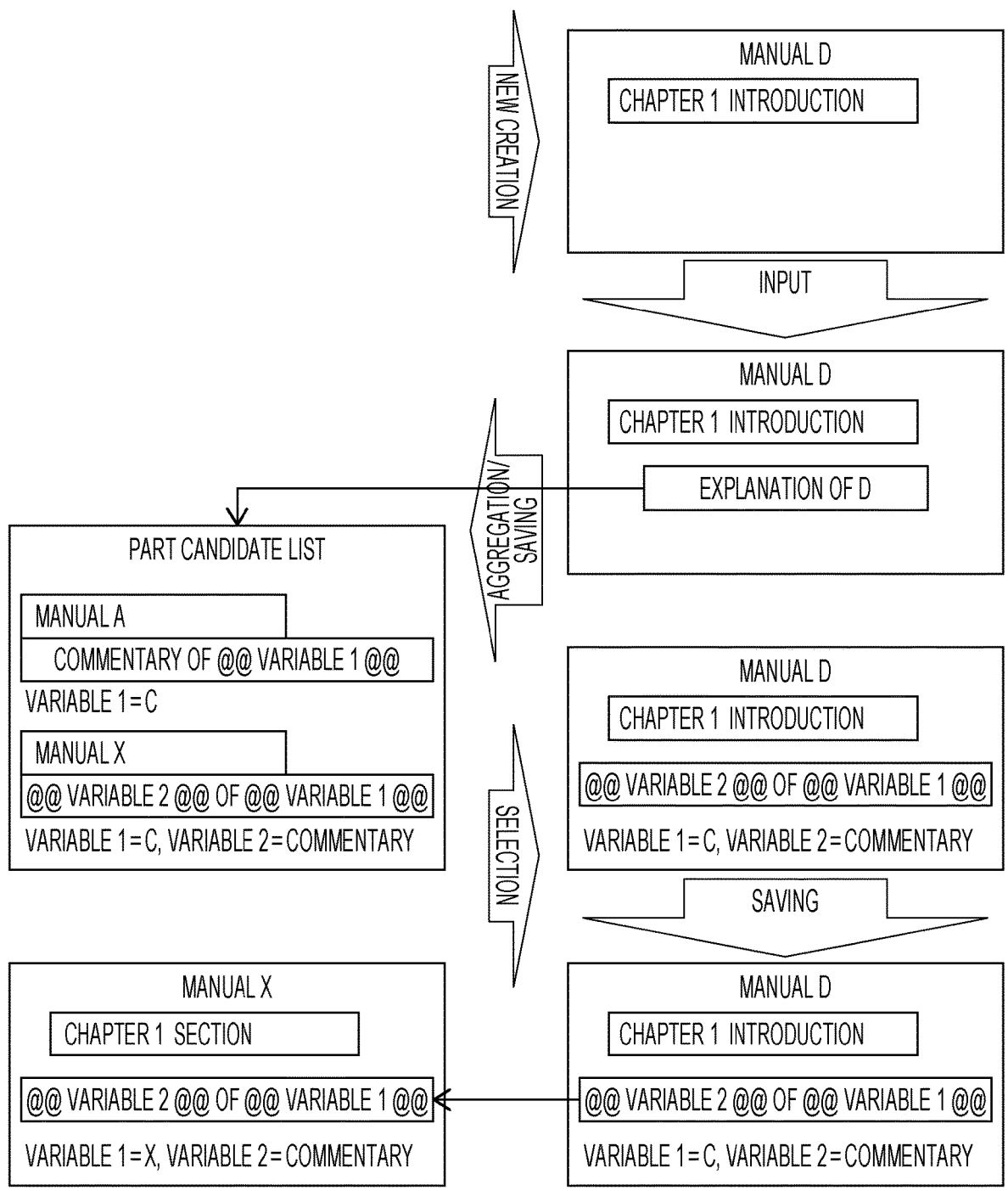
FIG. 15 is a figure illustrating a procedure in the case of performing input assistance (term standardization).

FIG. 15 is a figure illustrating a procedure in the case of performing the input assistance (term standardization). In describing a part, the input assistance (term standardization) can be performed. In performing the input assistance (term standardization), for example, as illustrated in FIG. 15, a manual D is newly created at first. Next, a block is newly added to input a text. Subsequently, operating aggregation searches for a part using a part attribute possessed by the manual D as a search key, the term standardization based on a term conversion list is applied to the input text, and part candidates usable by a variable function and a replacement function are listed. This search processing is the same as the processing in Step S132. The example of FIG. 15 illustrates a case of a rule that the "explanation" is standardized to be the "commentary". Furthermore, the variable function and the replacement function perform the processing so that the selected part can be used.

It should be noted that the example of FIG. 15 illustrates only the variable function. Next, operations in the case of generating a manual will be explained.

Figure 16:
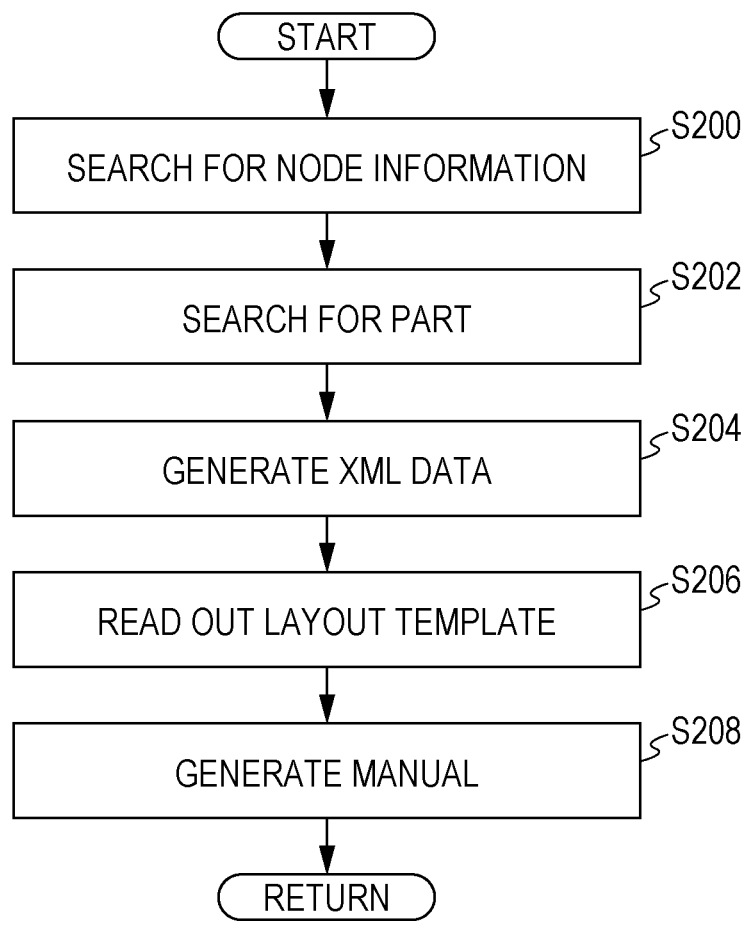
FIG. 16 is a flow chart illustrating manual generation processing.

FIG. 16 is a flow chart illustrating manual generation processing. In the user terminal 200, when manual creation is completed, a manual generation request is performed to the manual creation support server 100.

Once the manual generation request is performed, the CPU 30 activates a prescribed program stored in a prescribed region of the ROM 32 and executes the manual generation processing illustrated in the flow chart of FIG. 16 according to that program.

When the manual generation processing is executed in the CPU 30, firstly, a shift is made to Step S200 as illustrated in FIG. 16.

In Step S200, the manual management table 420 is searched for node information concerning a manual to be generated, and a shift is made to Step S202. In Step S202, based on the searched node information, the part management table 440 is searched for a part described in the node information, and a shift is made to Step S204.

In Step S204, extensible markup language (XML) data structuring the part is generated based on the node information and the part that are searched, and a shift is made to Step S206. In Step S206, a layout template designated for the manual to be generated is read out from the storage device 42, and a shift is made to Step S208. In Step S208, the manual is generated as, for example, a PDF file based on the generated XML data and the readout layout template, and the series of processing are completed to return to the original processing.

FIG. 17 is a figure for explaining realization of various layouts by layout template.

As illustrated in FIG. 17, only designating layout templates can generate the manual in various layouts.

Next, effects of the present embodiment will be explained. In the present embodiment, via the part attribute of the manual management table 420 corresponding to the search key, the part management table 440 is searched for the part used in the manual corresponding to the part attribute.

In this manner, a necessary part can be effectively found as compared to conventional techniques. Furthermore, in the present embodiment, as to the aggregation object parts A and B, each difference portion from the other is determined, and the aggregation object parts A and B are aggregated as one part in which the texts included in the difference portions of the aggregation object parts A and B are replaced with a variable name. Then, the manual management table 420 registers the variable name and the variable value showing the difference portion of the aggregation object part A, in association with the manual that uses the part aggregating the aggregation object part A, and the manual management table 420 registers the variable name and the variable value showing the difference portion of the aggregation object part B, in association with the manual that uses the part aggregating the aggregation object part B.

In this manner, it is possible to suppress an increase in the parts having similar contents. In addition, the context common in multiple manuals can be applied with the variable value corresponding to the manual.

Furthermore, in the present embodiment, as to the aggregation object parts A and B, each difference portion from the other is determined, and as to images or the like of the difference portions of the aggregation object parts A and B, the aggregation object parts A and B are aggregated as one part in which the images or the like with the same content included in the difference portions of the aggregation object parts A and B are replaced with a common replacement character.

In this manner, it is possible to suppress an increase in the parts having similar contents. In addition, one element can be used for multiple locations, and changes of the element also become easier.

Furthermore, in the present embodiment, the part attribute corresponding to the manual during creation is acquired as a search key, and via the part attribute of the manual management table 420 corresponding to the acquired search key, the part management table 440 is searched for the part used in the manual corresponding to the part attribute. Then, the part used in the manual during creation and the searched part are aggregated as one part.

In this manner, it is possible to aggregate the parts effectively. Furthermore, in the present embodiment, the part attribute corresponding to the manual during creation is acquired as a search key, and via the part attribute of the manual management table 420 corresponding to the acquired search key, the part management table 440 is searched for the part used in the manual corresponding to the part attribute. Then, the conversion object term included in the part used in the manual during creation is converted into the standard term based on the term conversion list, and the part whose term is converted and the searched part are aggregated as one part.

In this manner, it is possible to aggregate the parts after the term standardization. Furthermore, in the present embodiment, the manual to be based on for creation is selected, and the part attribute to be set in the creation object manual is selected. Then, the difference portion common per part is determined in multiple manuals corresponding to the selected part attribute, and the determined common difference portion is added to the selected manual to be based on, thereby configuring the creation object manual.

In this manner, only updating the difference portion can create the manual. Furthermore, in the present embodiment, the variable name included in the element is converted into the variable value corresponding to the variable name based on the variable information of the manual to be generated.

In this manner, the context common in multiple manuals can be applied with the variable value corresponding to the manual.

Furthermore, in the present embodiment, an image or a mathematical formula is acquired from the library based on the replacement character included in the part, and the manual is generated based on the acquired image or mathematical formula.

In this manner, one element can be used for multiple locations, and changes of the element also become easier.

Furthermore, in the present embodiment, the part and the arrangement order or hierarchical relationship thereof are edited, XML data structuring the edited part is generated, and based on the generated XML data and the layout template, the manual is generated.

In this manner, the part and the arrangement order or hierarchical relationship thereof can be edited, which eases manual creation. In addition, since the manual is generated based on the XML data and the layout template, editing can be performed without consideration on the layout, and a manual with uniform quality can be created regardless of the creator's ability.

Furthermore, in the present embodiment, the part management table 440 is searched for the part, the arrangement order or hierarchical relationship of the selected part is incorporated into the node information of the manual management table 420, and the part of the part management table 440 is updated. Then, the XML data structuring the part is generated based on the part of the part management table 440 and the node information of the manual management table 420, and the manual is generated based on the generated XML data and the layout template.

In this manner, since selecting the part incorporates the arrangement order or hierarchical relationship of the part into the node information, the part can be used for multiple manuals, which eases manual creation. In addition, once the part of the part management table 440 is updated, the update content is commonly reflected to the parts to be updated in multiple manuals using the part to be updated, which enables a consistent editing in the multiple manuals. Furthermore, since the manual is generated based on the XML data and the layout template, editing can be performed without consideration on the layout, and a manual with uniform quality can be created regardless of the creator's ability.

Furthermore, in the present embodiment, the function to delete the part of the part management table 440 and the function to delete the description related to the part in the node information of the manual management table 420 without deleting the part of the part management table 440 are provided.

In this manner, deleting the part of the part management table 440 enables batch deletion of the parts in multiple manuals using the common parts. In addition, deleting the description related to the part in the node information enables individual deletion of the part in a specified manual among multiple manuals using the common parts.

Furthermore, in the present embodiment, the manual management table 420 is searched for the node information concerning the part to be updated, and based on the searched node information, the list of object manuals using the part to be updated is presented.

In this manner, the list of object manuals is displayed in changing the part content, which can make it understandable which manual is influenced by the part update.

In the present embodiment, the storage device 42 corresponds to the part storage means of Invention 1 or 2, the node information storage means of Invention 1, the template storage means of Invention 1, the part attribute information storage means of Invention 1 or 5, the variable information storage means of Invention 3, the element storage means of Invention 4, the term conversion information storage means of Invention 6, or the document storage means of Invention 7 or 8. In addition, Step S90 corresponds to the document selection means of Invention 7 or 8, the part attribute information acquisition means of Invention 7 or 8, the difference portion determination means of Invention 7 or 8, or the document configuration means of Invention 7 or 8, and Step S132 corresponds to the part search means of Invention 1, 5, or 6.

In addition, in the present embodiment, Step S204 corresponds to the structured data generation means of Invention 1, Step S208 corresponds to the document generation means of Invention 1, 3, or 4, the manual corresponds to the document of Invention 1, 3, or 8, and the XML data corresponds to the structured data of Invention 1. In addition, the variable name or the replacement character corresponds to the reference information of Invention 2 or Invention 4, the variable name corresponds to the variable identification information of Invention 3, and the variable value corresponds to the variable content information of Invention 3.

[Modification Example] It should be noted that although the above-described embodiment was realized as a network system, not limited thereto, it can be realized as a single apparatus or an application.

In addition, although the above-described embodiment and its modification example explained the case of being applied to the network system composed of the Internet 199, not limited thereto, for example, they may be applied to a so-called intranet that performs communication by the same method as that of the Internet 199. Of course, not limited to a network that performs communication by the same method as that of the Internet 199, they can be applied to a network by any communication method.

In addition, the above-described embodiment and its modification example explained cases in which the program stored in the ROM 32 in advance is executed when executing the processing illustrated in the flow charts of FIG. 8 and FIG. 16. However, not limited thereto, the RAM 34 may read a program indicating those procedures from a storage medium storing that program, and execute the program.

In addition, in the above-described embodiment and its modification example, the present invention was applied to cases in which the manual is created per company. However, not limited thereto, the present invention can also be applied to other cases without departing from the scope of the present invention. For example, the present invention can be applied to the case of creating a document other than the manual.

DESCRIPTION OF REFERENCE CHARACTERS

100 manual creation support server
200 user terminal
30 CPU
32 ROM
34 RAM
38 I/F
39 bus
40 input device
42 storage device
44 display device
199 Internet
400 company information management table
410 category information management table
420 manual management table
430 and 440 part management tables
450 image management table
460 mathematical formula management table
470 version management table

The invention claimed is:

1. A document creation support system, comprising:
a part storage means that stores a part comprised of one or multiple elements and an attribute of the part;
a node information storage means that stores node information specifying an arrangement order or hierarchical relationship of the part by document;
a structured data generation means that generates structured data structuring the part, based on the part of the part storage means and the node information of the node information storage means;
a template storage means that stores a layout template specifying a layout of the part;
a document generation means that generates the document, based on the structured data generated in the structured data generation means, and the layout template of the template storage means;
a part attribute information storage means that stores part attribute information related to the attribute of the part used in the document, in association with the document;
a part attribute information acquisition means that acquires the part attribute information corresponding to the document during creation from the part attribute information storage means;
a part search means that searches the part storage means for the part used in the document different from the document during creation, wherein the attribute of the part used in the document different from the document during creation relates to the part attribute information acquired by the part attribute information acquisition means; and
a part output means that outputs the part searched by the part search means.

2. The document creation support system of claim 1, further comprising a searched part list display means for displaying a list of the part searched by the part search means.

3. A document creation support system, comprising:
a part storage means that stores a part comprised of one or multiple elements and an attribute of the part;
a node information storage means that stores node information specifying an arrangement order or hierarchical relationship of the part by document;
a structured data generation means that generates structured data structuring the part, based on the part of the part storage means and the node information of the node information storage means;
a template storage means that stores a layout template specifying a layout of the part;
a document generation means that generates the document, based on the structured data generated in the structured data generation means, and the layout template of the template storage means;
a part attribute information storage means that stores part attribute information related to the attribute of the part used in the document, in association with the document;
a part attribute information acquisition means that acquires the part attribute information corresponding to the document during creation from the part attribute information storage means;
a part search means that searches the part storage means for the part used in the document different from the document during creation, wherein the attribute of the part used in the document different from the document during creation relates to the part attribute information acquired by the part attribute information acquisition means;
a part aggregation means that determines, as to a first part that is selected by a user in the document during creation and a second part that is the part searched by the part search means, a first difference portion of the first part, which is different from the second part, and a second difference portion of the second part, which is different from the first part, and aggregates the first part and the second part as one part in which the first difference portion and the second difference portion are replaced with reference information; and a variable information storage means that stores variable information specifying variable identification information and variable content information, in association with the document, wherein the part aggregation means registers in the variable information storage means, as the variable identification information, the reference information and, as the variable content information, the first difference portion of the first part, in association with the document in which a part aggregating the first part is used, and registers in the variable information storage means, as the variable identification information, the reference information, and as the variable content information, the second difference portion of the second part, in association with the document in which a part aggregating the second part is used, and the document generation means converts the variable identification information included in the part into variable content information corresponding to the variable identification information, based on variable information of the document to be generated among the variable information of the variable information storage means.

4. The document creation support system of claim 3, comprising:

a term conversion information storage means that stores term conversion information including a conversion object term to be converted, and a standard term that should be standardized after conversion; and a term conversion means that converts the conversion object term included in the part selected by the user in the document during creation into the standard term, based on the term conversion information of the term conversion information storage means, wherein the part aggregation means aggregates the part in which a term is converted by the term conversion means, and the part searched by the part search means, as one part.

5. A document creation support system, comprising:

a part storage means that stores a part comprised of one or multiple elements and an attribute of the part;

a node information storage means that stores node information specifying an arrangement order or hierarchical relationship of the part by document;

a structured data generation means that generates structured data structuring the part, based on the part of the part storage means and the node information of the node information storage means;

a template storage means that stores a layout template specifying a layout of the part;

a document generation means that generates the document, based on the structured data generated in the structured data generation means, and the layout template of the template storage means;

a part attribute information storage means that stores part attribute information related to the attribute of the part used in the document, in association with the document;

a part attribute information acquisition means that acquires the part attribute information corresponding to the document during creation from the part attribute information storage means;

a part search means that searches the part storage means for the part used in the document different from the document during creation, wherein the attribute of the part used in the document different from the document during creation relates to the part attribute information acquired by the part attribute information acquisition means;

an element storage means that stores, in association with element identification information for identifying the element, the element; and a part aggregation means that determines, as to a first part that is selected by a user in the document during creation and a second part that is searched by the part search means, a first difference portion of the first part, which is different from the second part and includes first different element identification information, and a second difference portion of the second part, which is different from the first part and includes second different element identification information, and aggregates the first part and the second part as one part in which the first different element identification information and the second different element identification information are replaced with reference information including the common element identification information, wherein the first different element identification information is for identifying the element included in the first difference portion, the second different element identification information is for identifying the element included in the second difference portion, and data content of the element included in the first difference portion is identical to data content of the element included in the second difference portion; wherein the document generation means acquires the element from the element storage means, based on the reference information included in the part and generates the document, based on the acquired element.

6. The document creation support system of claim 5, comprising a variable information storage means that stores variable information specifying variable identification information and variable content information, in association with the document, wherein the part aggregation means registers in the variable information storage means, as the variable identification information, the reference information and, as the variable content information, the first difference portion of the first part, in association with the document in which a part aggregating the first part is used, and registers in the variable information storage means, as the variable identification information, the reference information, and as the variable content information, the second difference portion of the second part, in association with the document in which a part aggregating the second part is used, and the document generation means converts the variable identification information included in the part into variable content information corresponding to the variable identification information, based on variable information of the document to be generated among the variable information of the variable information storage means.

* * * * *